United States Patent
Steele (10) Patent No.: US 10,277,611 B2
(45) Date of Patent: Apr. 30, 2019

(54) ABATING PADDING ORACLE ATTACKS

(71) Applicant: Adobe Inc., San Jose, CA (US)

(72) Inventor: Joseph Steele, Danville, CA (US)

(73) Assignee: ADOBE INC., San Jose, CA (US)

( * ) Notice: Subject to any disclaimer, the term of this patent is extended or adjusted under 35 U.S.C. 154(b) by 354 days.

(21) Appl. No.: 14/832,406

(22) Filed: Aug. 21, 2015

(65) Prior Publication Data

US 2017/0054741 A1 Feb. 23, 2017

(51) Int. Cl.
*H04L 29/06* (2006.01)
*G06F 17/30* (2006.01)

(52) U.S. Cl.
CPC ........ *H04L 63/1416* (2013.01); *H04L 63/123* (2013.01); *H04L 63/1441* (2013.01)

(58) Field of Classification Search
CPC ............. H04L 63/1416; H04L 63/1441; H04L 63/123

See application file for complete search history.

(56) References Cited

U.S. PATENT DOCUMENTS

| | | | |
|---|---|---|---|
| 2008/0052774 A1* | 2/2008 | Chesla | G06F 21/552 726/13 |
| 2013/0346749 A1* | 12/2013 | Wray | H04L 63/1441 713/168 |
| 2014/0337615 A1* | 11/2014 | Tomkow | H04L 63/0428 713/153 |
| 2015/0096023 A1* | 4/2015 | Mesdaq | H04L 63/145 726/23 |

* cited by examiner

*Primary Examiner* — Noura Zoubair
(74) *Attorney, Agent, or Firm* — Keller Jolley Preece (57) ABSTRACT

The present disclosure is directed toward systems and methods for identifying and abating padding oracle attacks. One or more embodiments described herein identify and abate padding oracle attacks without necessitating any changes or upgrades to an existing encryption system by providing an intermediate service that can intercept communications from a client-computing device intended for a padding oracle.

20 Claims, 6 Drawing Sheets

ABATING PADDING ORACLE ATTACKS

CROSS REFERENCE TO RELATED APPLICATIONS

N/A

BACKGROUND

1. Technical Field

One or more embodiments described herein relate generally to enhancing data security. More specifically, one or more embodiments relate to abating padding oracle attacks in a network environment.

2. Background and Relevant Art

As much of the world's business and commerce transitions to the Internet, data security is an ever-growing concern. It is not uncommon for a company with an on-line presence to become the target of any of a number of different types of cyber attacks. For this reason, on-line communications and transactions data is often encrypted. Thus, if a hacker manages to exploit a network weakness and break into a particular system, the data residing therein is obfuscated to the point that it is unreadable. Despite this, some types of attacks seek to break through various encryption algorithms, such that even encrypted data is no longer safe.

A padding oracle attack is one such attack that exploits commonly used encryption schemes. For example, in certain block cipher mode encryption algorithms (e.g., "Electronic Codebook" mode encryption, "Cipher Block Chaining" mode encryption) plain text blocks are "padded" before encryption such that the encryption results in a series of cipher text blocks that are each a standard length. In a padding oracle attack, an attacker at a client-computing device can intercept an encrypted message. The attacker can flip or change a single bit within the block and forward the encrypted message to the intended oracle server. The oracle server may detect an error and send an error message back to the attacker. The error message can include details of precisely what the error was, e.g., whether the error was detected in the decryption process, or whether the error was detected in a subsequent processing stage, and if so, the precise nature of the error. Often the information from the error message is a function of the original message and the modifications performed by the attacker. For certain cryptographic techniques, this information is such that, after a number of similar modifications and re-transmissions, the attacker may be able to determine the content of the original message or even cause the oracle server to decrypt messages (sent by the attacker) using the oracle's key.

Thus, there is a need for a method for detecting and abating padding oracle attacks.

SUMMARY

One or more embodiments described herein provide benefits and/or solve one or more of the foregoing or other problems in the art with systems and methods that provide efficient and effective abatement of padding oracle attacks. For example, one or more embodiments include systems and methods that allow for detection and abatement of padding oracle attacks without changing or upgrading any software and/or hardware in an existing system. Rather, systems and methods described herein provide an intermediate server that detects and abates padding oracle attacks without necessitating any upgrades to an existing system.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Data security specialists typically deal with padding oracle attacks in various ways. One solution is for a data security specialist to change the communication protocol at the client-side to include an authentication layer that covers the encrypted cipher text blocks. Thus, the data security specialist would also have to add methods to the server receiving the cipher text blocks to unlock the added authentication layer before any decryption occurs. Another solution is to wrap the entire communication protocol in another authenticated protocol (e.g., SSL/TLS). But again, this would require further changes at both the client and server sides.

Accordingly, the existing solutions for warding off padding oracle attacks require programmatic changes at the client that sends the encrypted communications, and/or at the server that hosts the padding oracle and/or handles decryption tasks. This is problematic when dealing with legacy systems that cannot be upgraded or changed. For example, a company may not be able to make programmatic changes to existing systems because existing protocols are "hard-wired," because servers are remotely located or inaccessible, etc. In such circumstances, a padding oracle attack abatement solution is needed that does not require changes to existing server systems. Thus, there are several disadvantages to current methods for detecting and abating padding oracle attacks.

One or more embodiments described herein include an abatement system that detects and abates padding oracle attacks without necessitating any changes or upgrades to an existing oracle server system (e.g., a padding oracle server and client devices in communication with the padding oracle server). The abatement system is an intermediate system (e.g., an intermediate server or a proxy layer between an oracle server and at least one existing client-computing device) that intercepts encrypted communications intended for a padding oracle server, determines whether the communications are likely part of a padding oracle attack, and appropriately abates any detected attacks. Thus, the abatement system effectively wards off padding oracle attacks without any upgrades or changes to the padding oracle server and client devices in communication with the padding oracle server.

The abatement system intercepts an encrypted communication and cryptographically digests the unpadded portion of the encrypted communication. The encrypted communication includes two portions, i.e. padded portion and unpadded portion. The unpadded portion comprises the encrypted message, while the padded portion comprises filler bytes that serve to ensure the encrypted message is the correct length. In order to cryptographically digest an encrypted message, the abatement system performs a hash of the unpadded portion of the encrypted message. The abatement system then saves information related to the intercepted communication in a digest database. For instance in one or more embodiments, the abatement system saves a tuple containing the digest, a timestamp, and a counter in the digest database.

As the abatement system intercepts each new encrypted communication, the abatement system cryptographically digests each communication and identifies whether each digest exists in the digest database by performing a database lookup or "checksum" based on the digest of each communication. If a match is found in the digest database, the abatement system increments the counter associated with the particular digest to indicate that the abatement system has intercepted the same encrypted communication more than once. When the counter associated with a particular encrypted communication goes above a threshold amount, the abatement system determines that the particular encrypted communication is part of a padding oracle attack, and abates the attack.

In one embodiment, if the threshold is exceeded, the abatement system abates a padding oracle attack by returning an error message before any more processing takes place. The error message prevents providing information to the attacker that can potentially aid in the padding oracle attack. For example, the error message depends on the transport protocol and comprises a generic error message. In particular, the error message can mimic a transport failure (e.g., for HTTP traffic, the error comprises a 404 status). Additionally or alternatively, the abatement system abates a detected padding oracle attack by preventing messages detected as being part of a padding oracle attack from reaching the oracle server. Still further, in one or more embodiments, the abatement system abates a detected padding oracle attack by terminating a transport channel, raise an alarm, make a note in a security log, etc.

Term Descriptions:

As used herein, "padding" refers to extra bytes included in an encrypted message in order to fill the encrypted message to a required length. For example, in one or more embodiments, a cryptography service functions in connection with blocks of text that are a standard, pre-defined length (e.g., sixteen bytes). Thus, the cryptography service breaks an encrypted message into blocks of encrypted text that are the required length. When the encrypted message cannot be precisely broken into blocks of the required length (i.e., the last block is less than the required length), the cryptography service pads (adds bytes to) the last block in order to fill the block out to the required length.

As used herein, a "padding oracle" refers to a server or system within a server that responds to inquiries regarding whether the last block in an encrypted message is correctly padded. For example, a block may be incorrectly padded if the length of the block is longer or shorter than the block length required by the cryptography service. Additionally or alternatively, a block may be incorrectly padded if the padding bytes within the block do not include the correct character, etc.

As used herein, a "padding oracle attack" refers to an attack that focuses on the padding of an encrypted electronic message. For example, in a padding oracle attack, an attacker at a client-computing device flips or changes a single byte within the padding of a block representing a portion of an encrypted message and forwards the block to the padding oracle. The padding oracle detects an error within the padding of the block and sends an error message back to the attacker. The attacker can utilize information included in the error message to continue flipping bytes within the padding of the block until eventually, the padding oracle returns a favorable result indicating the message has successfully been decrypted. Thus, the attacker has utilized the padding oracle to decrypt an electronic message without knowing anything about the encryption system.

As used herein, "cryptographically digesting" or "digesting" refers to a process by which the abatement system utilizes a cryptographic hash function to generate a digest associated with an intercepted block of encrypted text. In one or more embodiments, the cryptographic hash function accepts an input of any length, but always returns a digest of the same length. The digest does include the decrypted contents of a block, but rather is a string of characters that are unique to only the block that the cryptographic hash function received as input.

As used herein, a "digest database" refers to a database created by the abatement system that includes one or more entries that track encrypted blocks of text intercepted by the abatement system. In one or more embodiments, each entry includes information associated with one intercepted block. For example, an entry can include a digest associated with a particular block, a counter indicating how many times the particular block has been intercepted by the abatement system, and a timestamp taken the last time the particular block was intercepted by the abatement system.

Figure 1:
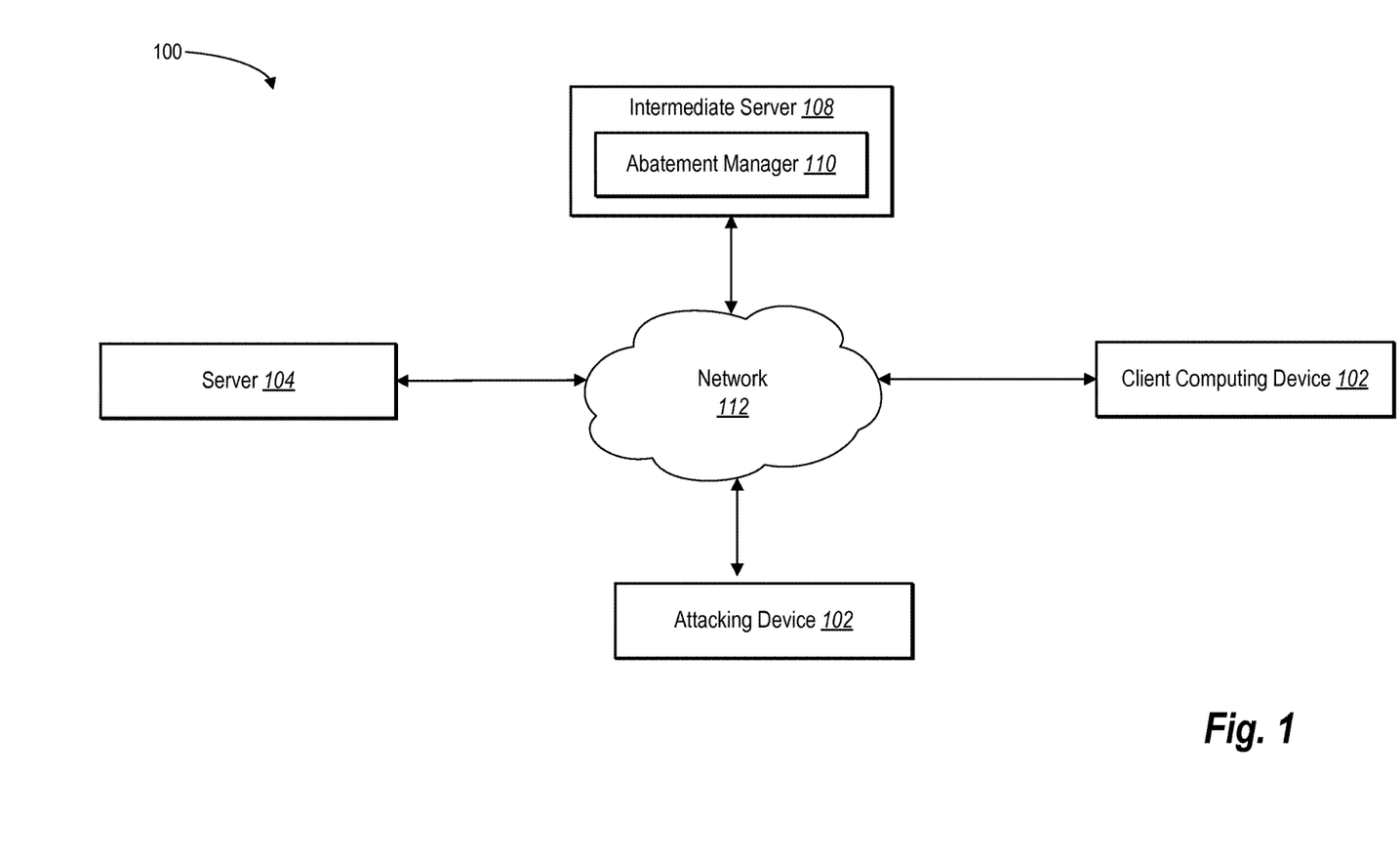
FIG. 1 illustrates a block diagram of an environment for implementing an abatement system in accordance with one or more embodiments.

One or more embodiments of the process by which the abatement system detects and abates padding oracle attacks will now be described in greater detail with reference to FIG. 1. FIG. 1 is a schematic diagram illustrating an abatement system 100 in accordance with one or more embodiments. As illustrated in FIG. 1, the abatement system 100 may include a client-computing device 102, a server 104, an attacking device 106, an intermediate server 108, and a network 112 (e.g., the Internet). As further illustrated in FIG. 1, the client-computing device 102 can communicate with the server 104 through the network 112. Similarly, the intermediate server 108 can communicate with the client-computing device 102 and the server 104 through the network 112. Furthermore, an attacking device 106 can communicate with the client-computing device 102, the intermediate server 108, and or the server 104.

The server 104 can host or comprise an oracle. As mentioned above, the oracle responds to inquiries regarding whether a message is correctly padded. In one or more embodiments, a cryptography service may function in connection with block of text of a standard, pre-defined length. Accordingly, the cryptography service may break a message for encryption/decryption into a series of blocks. Often, the last block in the series of blocks is only partially filled. Thus, the cryptography service can pad the last block such that the block is the preferred length.

In operation, the client-computing device 102 may send a series of encrypted blocks comprising an entire message including the last encrypted block (i.e., the block including padding) to the oracle on the server 104. If a last block in an encrypted message is meant to be sixteen bytes long, but contains a message portion of only seven bytes, the cryptography service may pad the remainder of the block with nine additional bytes. In some embodiments, the padding may be with a "1" or a "0." Alternatively, the padding may include a number that indicates the length of the padded section (e.g., "4 4 4 4," "3 3 3," "6 6 6 6 6 6"). In response to receiving a block from the client-computing device 102, the oracle at the server 104 can determine whether the block is correctly padded (i.e., the block is the correct length and contains the expected padding element.

If the oracle determines that a block is correctly padded, the oracle can allow the server 104 to perform further processing. For example, the server 104 can include the keys and algorithms required by the cryptography service in order to decrypt an encrypted message. Thus, the server 104 can decrypt a given block, once the oracle has indicated that the block is correctly padded. If the oracle determines that a block is not correctly padded, the oracle can send an error message to the client-computing device 102 indicating a padding error.

The attacking device 106 can intercept one of the encrypted blocks or the entire encrypted messages sent from the client-computing device 102 to the server 104. The attacking device 106 can modify one or more digits an encrypted block as part of a padding oracle attack. The attacking device 106, which can be a client-computing device, a server, or a plurality of devices, can then send the modified message to the server 104 as part of the padding oracle attack.

Also, as illustrated in FIG. 1, the intermediate server 108 can host an abatement manager 110. In one or more embodiments, the abatement manager 110 receives or intercepts communications intended for the server 104. Alternatively, the abatement manager 110 receives or intercepts communications from the server 104. The abatement manager 110 can determine whether the intercepted communications are part of a padding oracle attack.

In at least one embodiment, the server 104 can host the abatement manager 110 rather than the intermediate server 108. In yet further embodiments, the abatement manager 110 can be run as part of an existing service or as an invisible proxy layer between the client-computing device 102 and the server 104. In still further embodiments, rather than a proxy server (e.g., server 104) hosting the abatement manager 110, a non-proxy abatement server can host the abatement manager 110 so long as traffic going to the oracle server 104 is also send to the non-proxy abatement server. If the non-proxy abatement server detects a padding oracle attack, the non-proxy abatement server can terminate a transport channel, raise an alarm, make a note in a security log, etc. The non-proxy abatement server can terminate the transport of communications to the server 104 and send error messages in the event a padding oracle attack is detected. Thus, in one or more embodiments, it may not be necessary for the abatement manager 110 to receive a communication prior to the padding oracle 106 receiving the communication. Rather, the abatement manager 110 can prevent further communications from the attacker and/or make a note that a padding oracle attack was detected.

For ease in description, the abatement manager 110 is described below as being hosted by an intermediate server 108. One will appreciate in light of the disclosure herein that this is only one embodiment and is not limiting. In any event, in at least one embodiment the abatement system 110 can intercept and process a message prior to the oracle receiving the message.

The process by which the abatement manager 110 determines that an intercepted communication is part of a padding oracle attack will now be described in connection with FIG. 1. A padding oracle attack can begin with a device (e.g., the client computing device 102 or the attacking device 106) sending a message (e.g., an encrypted block) to the server 104. At this point, the intermediate server 108 can intercept the encrypted block before the encrypted block reaches the server 104 hosting the oracle. Once the abatement manager 110 has intercepted the encrypted block, the abatement manager 110 can determine whether the block is part of a padding oracle attack.

The process for determining whether an encrypted block is part of a padding oracle attack begins with the abatement manager 110 generating a digest of the encrypted block. In one or more embodiments, a digest of an encrypted block does not reveal the decrypted contents of the block, but rather is a "digital fingerprint" of the encrypted block. For example, the abatement manager 110 may utilize a cryptographic hash function that can receive an input of any length, but always returns a digest of the same length. For instance, the abatement manager 110 may utilize cryptographic hash functions such as "SHA-256," which returns a digest of 32 bits, or "SHA-512," which returns a digest of 64 bits. In at least one embodiment, the selected cryptographic hash function will returns a digest corresponding to the un-padded portion of the encrypted block. In additional or alternative embodiments, the selected cryptographic hash function will return a digest corresponding to the entire un-padded encrypted message, regardless of the number of blocks comprising the message.

Once the abatement manager 110 has generated a digest corresponding with all or a portion of the un-padded encrypted message, the abatement manager 110 can update a database with an entry associated with the intercepted encrypted block. For example, in one or more embodiments, the abatement manager 110 can maintain and access a digest database that includes entries associated with all encrypted messages intercepted by the abatement manager 110. In at least one embodiment, each entry stored includes a digest associated with an intercepted encrypted message, a counter, and a timestamp.

As mentioned above, a padding oracle attack relies on an attacker sending an encrypted block to the oracle over and over again while intermittently flipping bits in the block. Accordingly, the function of the digest database maintained by the abatement manager 110 is to store a record of intercepted encrypted blocks, such that the abatement manager 110 can identify a block that an attacking device 106 is attempting to send to the oracle more than once. In other words, the abatement manager 110 detects a padding oracle attack when the same encrypted block is sent to the oracle more than a threshold number of times.

Thus, once the abatement manager 110 has generated a digest associated with the intercepted encrypted message, the abatement manager 110 can determine whether an entry exists in the digest database that corresponds with the generated digest. For example, in one or more embodiments, the key to each entry in the digest database is the digest included in each entry. Accordingly, after generating the digest of the intercepted encrypted message, the abatement manager 110 can search the digest database for the digest in order to determine whether the abatement manager 110 previously intercepted the encrypted message.

If the digest database does not contain an entry associated with the generated digest, the abatement manager 110 can generate an entry associated with the intercepted encrypted message and add the entry to the digest database. For example, as mentioned above, the abatement manager can generate a digest database entry including the generated digest associated with the intercepted encrypted message, a counter, and a timestamp. As this is the first time the abatement manager 110 is adding an entry associated with the intercepted encrypted message to the digest database, the abatement manager 110 can assign the counter a value of "1," and can associated a timestamp with the digest.

If the digest database does contain an entry associated with the generated digest, the abatement manager 110 can update the existing entry. For example, the abatement manager 110 can increment the value of the counter within the entry associated with the digest by one. Thus, over time, the counter reflects the number of times the abatement manager 110 has intercepted the same encrypted message. In one or more embodiments, if the abatement manager 110 increments a counter associated with an entry, but determines that the counter is still below a threshold amount, the abatement manager 110 can also update the timestamp associated with the entry to reflect the time at which the counter was last incremented.

If the abatement manager 110 determines that an encrypted message has been intercepted more than once, the abatement manager 110 can next determine whether the intercepted message is likely part of a padding oracle attack. In one or more embodiments, the likelihood that an intercepted message is part of a padding oracle attack is based on the number currently assigned to the counter within an entry associated with the intercepted message. For example, in some embodiments, the abatement manager 110 may determine that a padding oracle attack is taking place when a particular counter is incremented past "1." In other embodiments, the abatement manager 110 may determine that a padding oracle attack is taking place when a particular counter is incremented past a threshold amount that represents a maximum number of digest database matches that the abatement manager 110 will tolerate before determining that a padding oracle attack is taking place.

In at least one embodiment, the abatement manager 110 determines the likelihood that the intercepted encrypted message is part of a padding oracle attack based on both the counter within the entry associated with the intercepted encrypted message, and on the time since the abatement manager 110 last intercepted the encrypted message. For example, in response to intercepting the encrypted block and determining that the counter in the entry associated with the digest of the encrypted block has been incremented past a threshold value, the abatement manager 110 can determine how much time has elapsed since the last time the message was intercepted. In one or more embodiments, the abatement manager 110 can determine how much time has elapsed since the message was last intercepted by the identifying the time that has elapsed in between the timestamp in the digest database entry associated with the digest of the intercepted message and the current time. If the amount of time that has elapsed since the last time the message was intercepted is less than a threshold amount of time that the abatement manager 110 will tolerate between attacks, the abatement manager 110 may determine that a padding oracle attack is likely occurring. In at least one embodiment, the threshold amount of time that the abatement manager 110 will tolerate between attacks is balanced between the time is would take for an attacker to break an average sized message, the size of the digest database that the abatement manager 110 is capable of hosting, and the likelihood of a finding a match given the selected cryptographic hash function (e.g., SHA-512 has a lower likelihood of finding a match than SHA-256).

In response to determining that an intercepted encrypted message is likely part of a padding oracle attack, the abatement manager 110 can take steps to protect the oracle and the server 104. First, the abatement manager 110 can withhold the intercepted message to ensure that the intercepted message is not forwarded to the oracle and/or the server 104. Next, the abatement manager 110 can respond to the attacking device 106 with an error message. As a padding oracle attack relies on the attacking device 106 being provided with specific error messages from the oracle, the abatement manager 110 can provide the client-computing device 102 with a general error from which little to no information may be gleaned (e.g., an "HTTP 404 Not Found" error). Alternatively, the abatement manager 110 can provide no response to the attacking device 106. In any event, upon determining that an intercepted message is part of a padding oracle attack, the abatement manager 110 can prevent the message from being forwarded or otherwise arriving at the server 104. In additional or alternative embodiments, the abatement manager 110 can store identifying information associated with the attacking device 106 (e.g., an IP address), such that any future encrypted blocks intercepted from the attacking device 106 are immediately determined to be part of a padding oracle attack.

Although FIG. 1 illustrates a particular arrangement of the client-computing device 102, the server 104, the attacking device 106, the intermediate server 108, and the network 112, various additional arrangements are possible. In one or more embodiments, the server 104 can include additional client-computing devices and/or servers. For example, in at least one embodiment, the server 104 can include a plurality of servers hosting distributed data. In that embodiment, in order to avoid attacks where a cluster of servers are being cycled through by an attacker, the intermediate server 108 can be shared by the plurality of servers. In additional or alternative embodiments, the intermediate server 108 may directly communicate with the server 104, by passing the network 112.

While FIG. 1 illustrates a single client-computing device 102, the abatement system 100 can include additional client-computing devices. For example, the server 104 and the intermediate server 108 may receive and respond to decryption requests from the client-computing device 102. Additionally, the server 104 and the intermediate server 108 may receive and respond to decryption requests from a plurality of additional client-computing devices. Examples of client-computing devices may include, but are not limited to, mobile devices (e.g., smartphones, tablets, etc.), laptops, desktops, or any other type of computing device. See FIG. 5 for additional information regarding client-computing devices.

As mentioned above, in one or more embodiments, the client-computing device 102, the server 104, and the intermediate server 108 can communicate through the network 112. In one or more embodiments, the network 112 may include the Internet or World Wide Web. The network 112, however, can include various types of networks that use various communication technology and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. The network 112 is further described with reference to FIG. 6 below.

Figure 2:
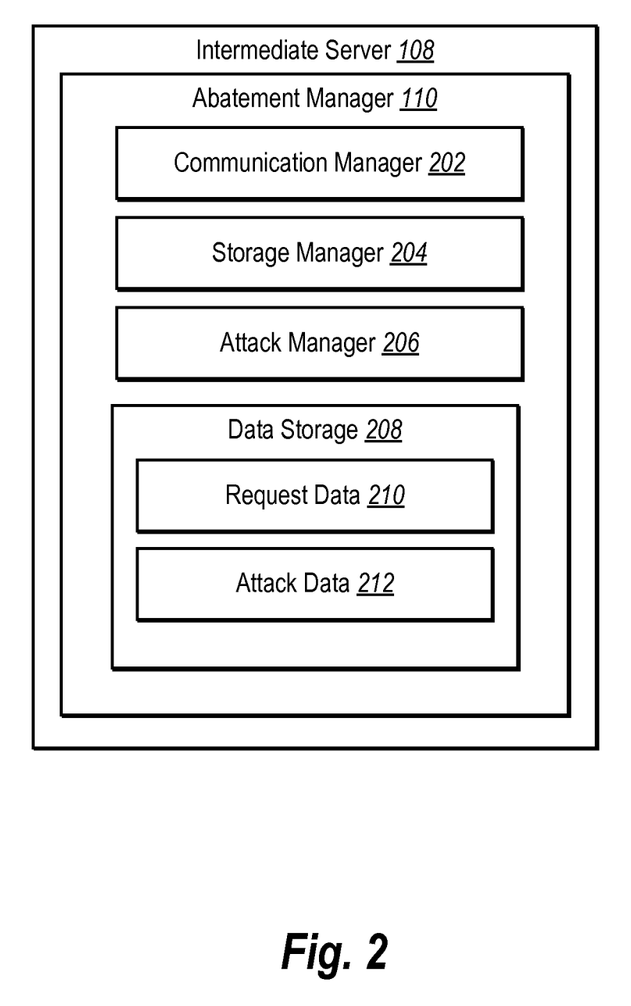
FIG. 2 illustrates a schematic diagram of the abatement system of FIG. 1 in accordance with one or more embodiments.

FIG. 2 illustrates an example architecture for a padding oracle attack abatement system. For example, as shown in FIG. 2, the abatement system 100 can include the abatement manager 110 (e.g., the abatement manager 110 hosted by the intermediate server 108 as shown in FIG. 1). In one or more embodiments, the abatement manager 110 can be a native application installed on the intermediate server 108. For instance, the abatement manager 110 may include software that runs on the intermediate server 108 and may be accessed remotely.

As shown in FIG. 2, the abatement manager 110 may include, but is not limited to, a communication manager 202, a storage manager 204, an attack manager 206, and a data storage 208, which includes request data 210 and attack data 212. In one or more embodiments, the components 202-208 can comprise software, hardware, or both. For example, the components 202-208 can comprise computer instructions stored on a non-transitory computer-readable storage medium and executable by at least one processor of the intermediate server 108. When executed by the at least one processor, the computer-executable instructions can cause the intermediate server 108 to perform the methods and processes described herein. Alternatively, the components 202-208 can comprise hardware, such as a special purpose processing device to perform a certain function or group of functions. Additionally or alternatively, the components 202-208 can comprise a combination of computer-executable instructions and hardware.

As mentioned above with reference to FIG. 1, the abatement manager 110 can intercept encrypted messages intended for the oracle, forward intercepted messages to the oracle, prevent intercepted messages from being passed to the oracle, and provide error messages to an attacking device 106. As shown in FIG. 2, the abatement manager 110 includes a communication manager 202. In one or more embodiments, the communication manager 202 handles all communication activities of the abatement manager 110. For example, the communication manager 202 can intercept and forward encrypted messages, as well as provide error messages.

As described above with reference to FIG. 1, the abatement manager 110 can cryptographically digest an intercepted encrypted message. As shown in FIG. 2, the abatement manager 110 includes a storage manager 204. In one or more embodiments, the storage manager 204 can utilize one or more hash algorithms in order to generate a digest of the intercepted encrypted message.

Also as described above with reference to FIG. 1, the abatement manager 110 can maintain, access, and update a digest database containing one or more entries related to encrypted messages intercepted by the abatement manager 110. In one or more embodiments, the storage manager 204 can access the digest database to search for entries using a particular digest as a key to the digest database. Additionally, the storage manager 204 can generate digest database entries for new intercepted messages including a digest, a counter, and a timestamp, as described above. Further, the storage manager 204 can update existing entries, as described above (e.g., in order to increment a counter and/or a timestamp associated with an entry). In at least one embodiment, the counter in each digest database entry may be optionally included (e.g., if using a cryptographic hash function with a low likelihood of collision, thus indicating that every digest database match is part of a padding oracle attack).

In at least one embodiment, the storage manager 204 can periodically delete entries in the digest database with timestamps beyond a threshold timestamp. For example, every day, the storage manager 204 can delete all entries in the digest database with timestamps that are older than 30 days prior to the current date. In one or more embodiments, the threshold timestamp can be configurable, such that a system administrator can ensure fewer legitimate collisions with regard to intercepted encrypted messages. Furthermore, in one or more embodiments, periodically purging the digest database of outdated records ensures that the digest database will not grow without bound. In additional or alternative embodiments, the storage manager 204 can delete entries in the digest database based on the threshold amount of time that the abatement manager 110 will tolerate between attacks. For example, if the threshold amount of time that the abatement manager 110 will tolerate between attacks is one day, the storage manager 204 may delete an entry that is associated with a timestamp from two days ago.

Furthermore, as described with reference to FIG. 1, the abatement manager 110 can identify an entry counter with a value above a threshold amount in order to determine whether an intercepted message associated with the entry is part of a padding oracle attack. As shown in FIG. 2, the abatement manager 110 includes the attack manager 206. In one or more embodiments, the attack manager 206 can determine whether the counter associated with a particular entry is assigned a value higher than a threshold amount. In at least one embodiment, in response to determining that the entry counter is assigned a value higher than a threshold amount, the attack manager 206 can also utilize the timestamp associated with the entry to determine the amount of time that has elapsed since the last time the abatement manager 110 intercepted the same block, as described above. If the amount of elapsed time is less than a threshold amount, the attack manager 206 can determine that it is even more likely that a padding oracle attack is occurring.

As mentioned above, and as illustrated in FIG. 2, the abatement manager 110 can also include a data storage 208. The data storage 208 may maintain request data 210, and attack data 212. In one or more embodiments, the request data 210 may include request information received by the abatement manager 110 (e.g., intercepted blocks of cipher text, as described above). Furthermore, in one or more embodiments, the attack data 212 may include attack information stored by the abatement manager 110 (e.g., the digest database, identifying information for client-computing devices determined to be perpetrators of padding oracle attacks).

The abatement system can provide abatement of padding oracle attacks independent of the protocol of the intercepted electronic messages. The abatement system can provide abatement of padding oracle attacks in a manner that is tunable based on the message size.

Figure 3:
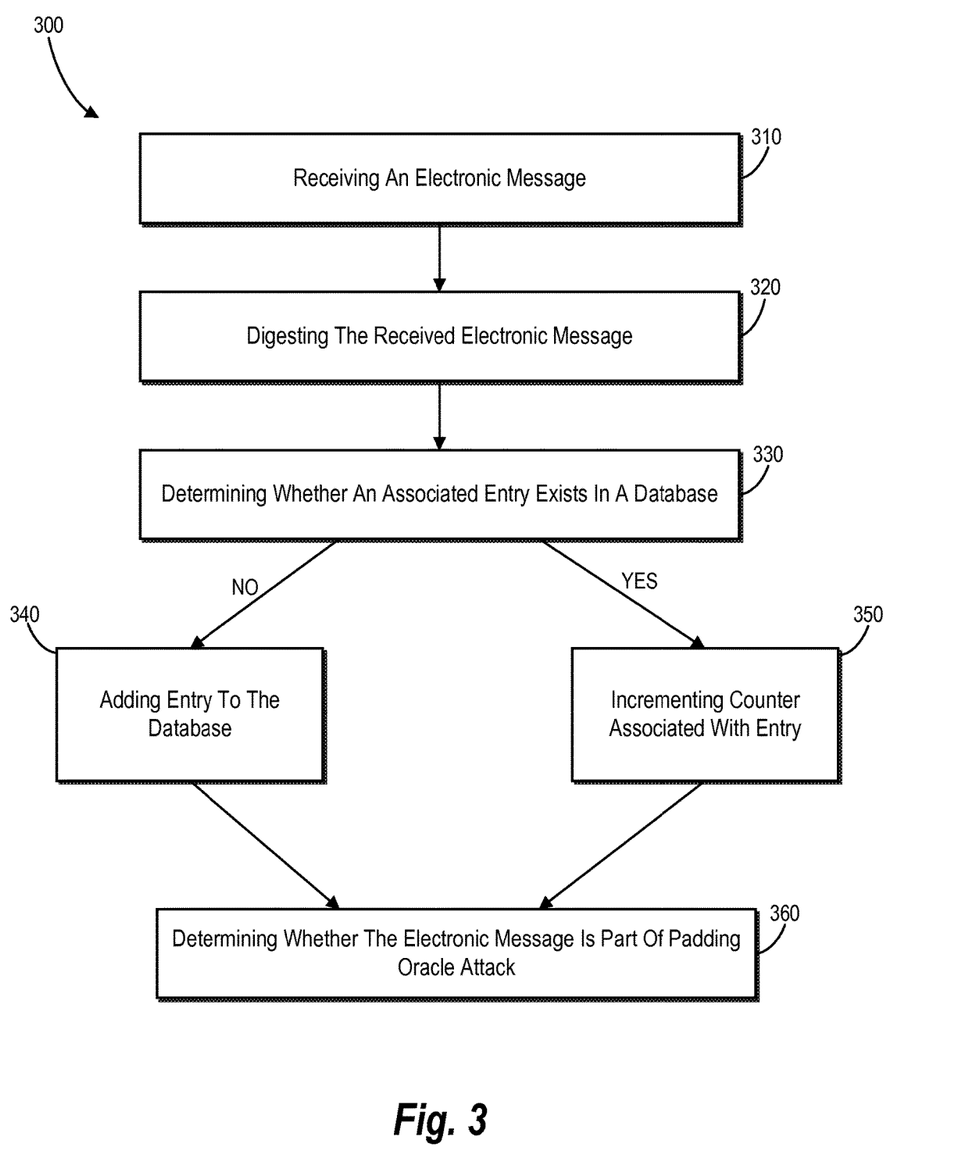
FIG. 3 illustrates a flowchart of a series of acts in a method of abating a padding oracle attack in accordance with one or more embodiments.
Figure 4:
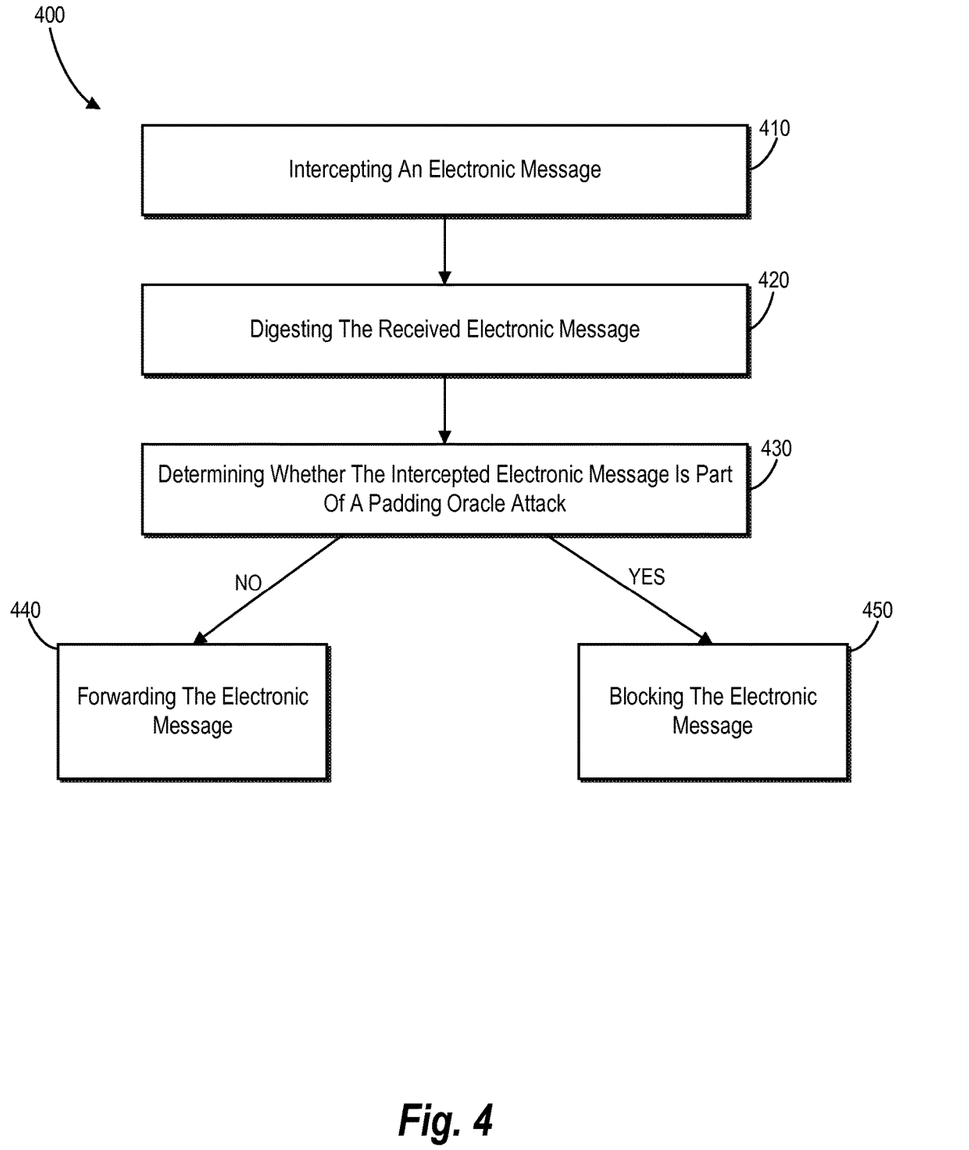
FIG. 4 illustrates a flowchart of a series of acts in a method of abating a padding oracle attack in accordance with one or more embodiments.

FIGS. 1 and 2, the corresponding text, and the examples provide a number of different methods, systems, and devices for abating padding oracle attacks without updating or changing an existing encryption system. In addition to the foregoing, embodiments can also be described in terms of flowcharts comprising acts and steps in a method for accomplishing a particular result. For example, FIGS. 3 and 4 illustrate two flowcharts illustrating methods of abating padding oracle attacks. While, FIGS. 3 and 4 illustrate particular embodiments, the methods described therein may be performed with less or more steps/acts or the steps/acts may be performed in differing orders. Additionally, the steps/acts described herein may be repeated or performed in parallel with one another or in parallel with different instances of the same or similar steps/acts.

FIG. 3 illustrates a flowchart of one example method 300 of abating a padding oracle attack. The method 300 includes an act 310 of receiving an electronic message. In particular, the act 310 can involve receiving an electronic message from one or more client-computing devices intended for one or more servers. In one or more embodiments, the one or more client-computing devices and the one or more servers are part of an encryption system. More particular, act 310 can involve receiving an encrypted message.

Additionally, the method 300 includes an act 320 of digesting the received electronic message. In particular, the act 320 can involve processing the received electronic message through a one-way hash algorithm that results in a digest of fixed size. In one or more embodiments, the one-way hash algorithm comprises one of Secure Hash Algorithm-256 or Secure Hash Algorithm-512.

The method 300 also includes an act 330 of determining whether an associated entry exists in a database. In particular, the act 330 can involve determining whether an entry associated with the digest of the received encrypted message exists in a database. In one or more embodiments, determining whether an entry associated with the digest of the received encrypted message exists in the database includes performing a database lookup wherein the digest is the lookup key. In one or more embodiments, act 330 can involve performing a checksum.

Furthermore, the method 300 includes an act 340 of adding an entry to the database. In particular, the act 340 can involve, if an entry associated with the digest does not exist in the database, adding an entry associated with the digest to the database. In one or more embodiments, adding an entry associated with the digest to the database includes adding an entry comprising the digest, a counter, and a timestamp to the database. In further embodiments, act 340 can involve adding an entry comprising the digest and a timestamp to the database with no counter.

The method 300 includes an act 350 of incrementing a counter associated with the entry. In particular, the act 350 can involve, if an entry associated with the digest exists in the database, incrementing a counter associated with the entry. In one or more embodiments, the method 300 can also include, in addition to incrementing the counter associated with the entry, re-assigning the value of the timestamp associated with the entry to the current date and time.

Additionally, the method 300 includes an act 360 of determining whether the electronic message is part of a padding oracle attack. In particular, the act 360 can involve determining, based on the counter associated with the entry, whether the electronic message is part of a padding oracle attack. In one or more embodiments, determining, based on the counter associated with the entry, whether the electronic message is part of a padding oracle attack includes determining whether the counter associated with the entry is above a threshold amount.

In one or more embodiments, the method 300 can also include determining the time since the counter was last incremented. In one or more embodiments, determining the time since the counter was last incremented includes identifying the time that has elapsed in-between the timestamp from the entry and the current time. In that case, determining whether the electronic message is part of a padding oracle attack can be further based on whether the time since the counter was last incremented is below a threshold amount. In at least one embodiment, the method 300 can include deleting one or more entries in the database associated with a timestamp beyond a threshold timestamp.

The method 300 can also include an act of, if the electronic message is not part of a padding oracle attack, forwarding the electronic message to a padding oracle. Furthermore, the method 300 can include an act of, if the electronic message is part of a padding oracle attack, abating the padding oracle attack. In one or more embodiments, abating the padding oracle attack includes identifying the sender of the electronic message, and providing a network error to the sender.

For example, upon determining that the electronic message is part of a padding oracle attack, the method 300 can involve returning an error message before any more processing takes place. More particularly, the method 300 can involve sending an error message that does not provide information to the attacking device 106 that can potentially aid in the padding oracle attack. For example, the method 300 can involve sending an error message based on a transport protocol of the intercepted electronic message. In particular, the method 300 can involve sending an error message that mimics a transport failure (e.g., for HTTP traffic, the error can comprise a 404 status).

FIG. 4 illustrates a flowchart of another example method 400 of abating a padding oracle attack. The method 400 includes an act 410 of incepting an electronic message. In particular, the act 410 can involve intercepting an encrypted electronic message intended for a padding oracle.

Additionally, the method 400 includes an act 420 of digesting the intercepted electronic message. In one or more embodiments, digesting the intercepted electronic message includes processing the intercepted electronic message through a one-way hash algorithm that results in a digest of fixed size. For example, the one-way hash algorithm can be one of Secure Hash Algorithm-256 or Secure Hash Algorithm-512.

The method 400 also includes an act 430 of determining whether the intercepted electronic message is part of a padding oracle attack. In particular, the act 430 can involve determining, based on whether an entry exists in a digest database corresponding with the intercepted electronic message. In one or more embodiments, act 430 includes digesting the intercepted electronic message and performing a database lookup on the digest database for the entry. Act 430 can involve using the digest as the lookup key. Act 430, in one embodiment, can involve identifying a counter associated with the entry, and determining whether the counter is above a threshold amount.

In additional or alternative embodiments, act 430 can involve identifying a timestamp associated with the entry and determining whether the time that has elapsed in-between the timestamp associated with the entry and the current time is below a threshold amount. In such embodiments, the method 400 does not involve using a counter or determining whether the counter is above a threshold amount. In particular, the act 430 of determining whether the intercepted electronic message is part of a padding oracle attack can be based entirely upon confirming that a digest for the intercepted electronic message equals an entry in a digest database and that a timestamp of the intercepted electronic message is within a predetermined threshold amount of time between of a timestamp of the entry in the digest database.

Furthermore, the method 400 includes an act 440 of forwarding the electronic message. In particular, the act 440 can involve, if the intercepted electronic message is not part of a padding oracle attack, forwarding the electronic message to the padding oracle or the server 104. The method 400 also includes an act 450 of blocking the electronic message 450. In particular, the act 450 can involve, if the intercepted electronic message is part of a padding oracle attack, blocking the electronic message from reaching the server 104 and the oracle. In one or more embodiments, act 440 also involves identifying the sender of the electronic message. Additionally, blocking the electronic message can further include providing the identified sender with a network error. In some embodiments, the method 400 can include deleting one or more entries in the digest database associated with a timestamp beyond a threshold timestamp.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
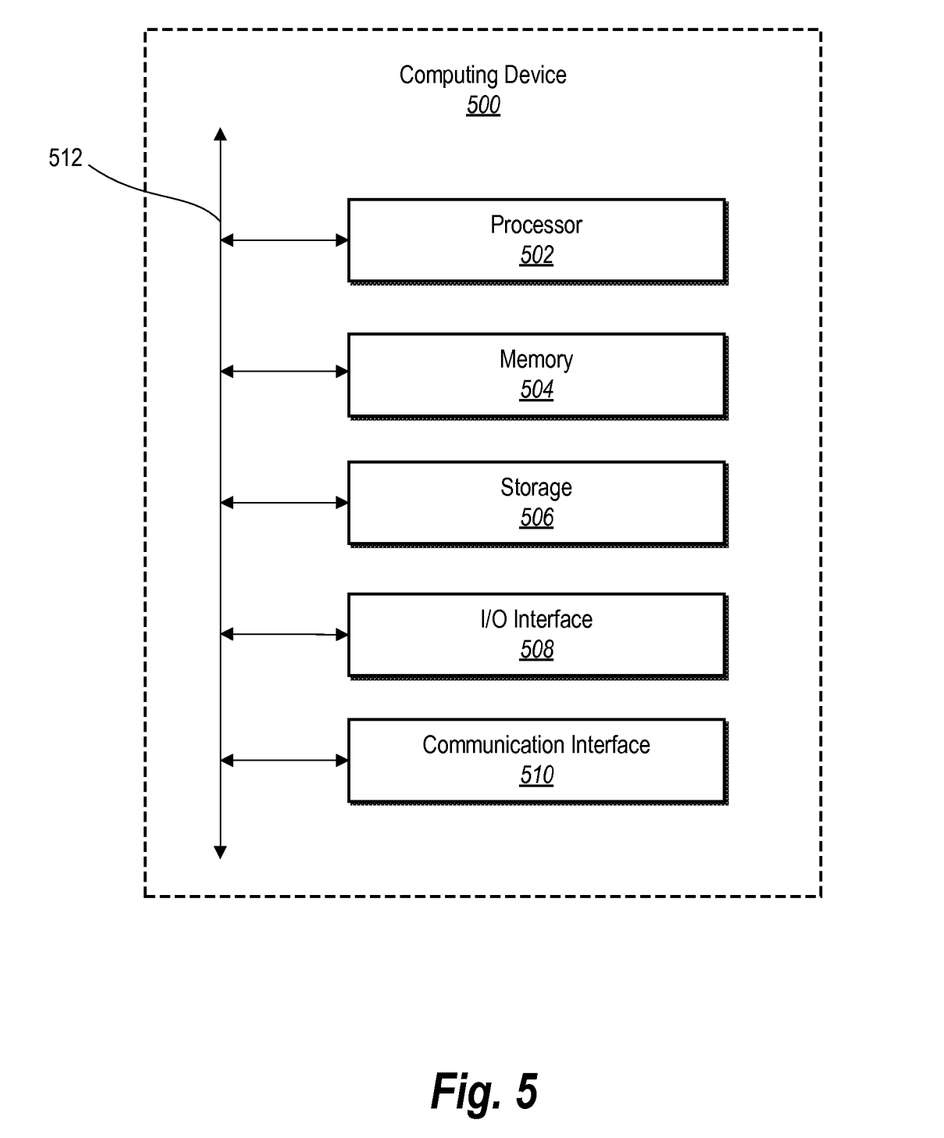
FIG. 5 illustrates a block diagram of an exemplary computing device in accordance with one or more embodiments.

FIG. 5 illustrates a block diagram of an exemplary computing device 500 that may be configured to perform one or more of the processes described above. One will appreciate that the abatement system 100 may be implemented by one or more computing devices such as the computing device 500. In particular, the client-computing device 102, the server 104, the intermediate server 108, and the network 112 can comprise a computing device 500. As shown by FIG. 5, the computing device 500 can comprise a processor 502, memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In particular embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In particular embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, the storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In particular embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from the computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 6:
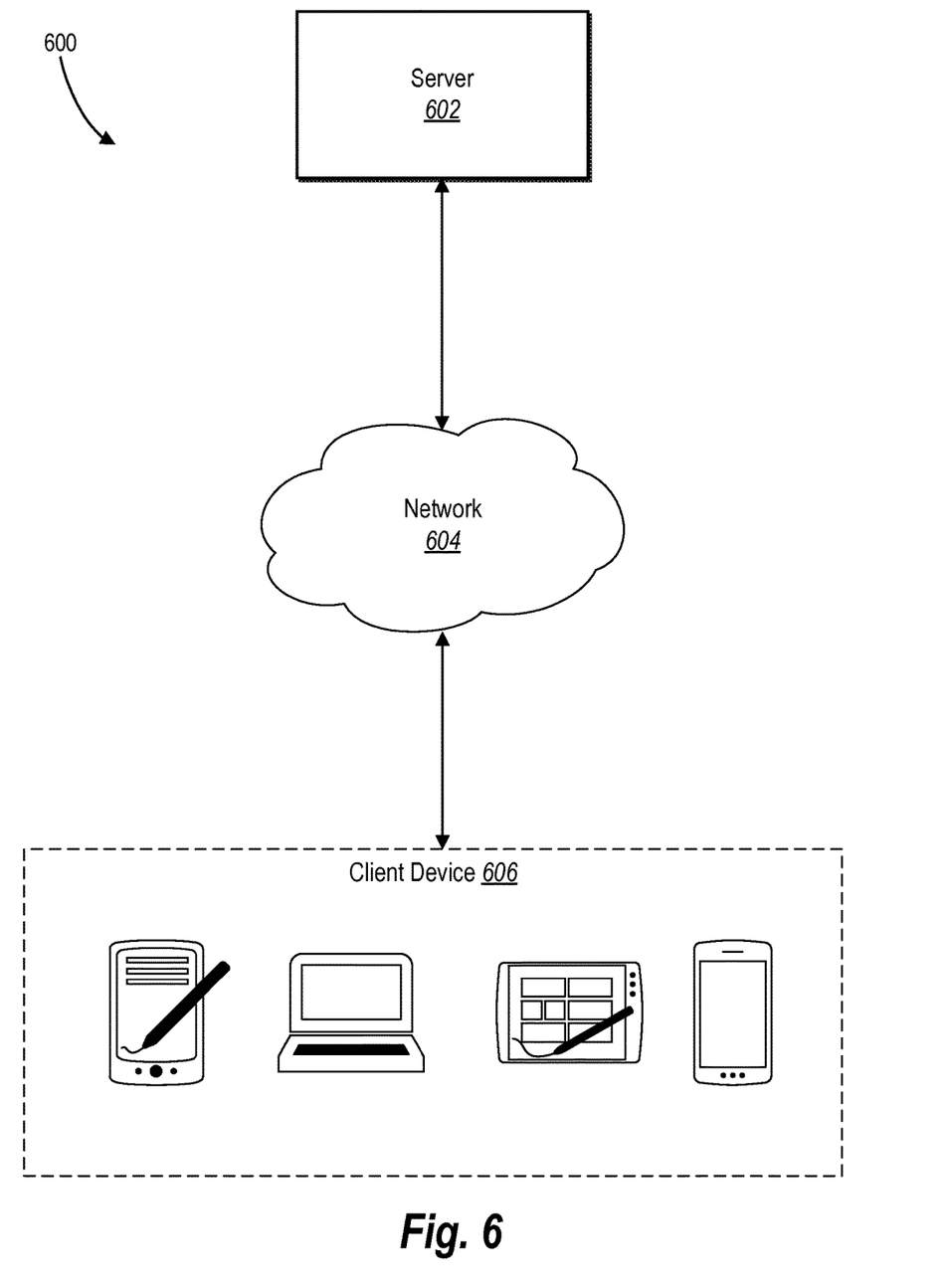
FIG. 6 is an example network environment of a server in accordance with one or more embodiments.

FIG. 6 illustrates an example network environment 600 in which the server 104 and/or the intermediate server 108 can operate. The network environment 600 includes a client system 606, and a server 602 connected to each other by a network 604. Although FIG. 6 illustrates a particular arrangement of the client system 606, the server 602, and the network 604, this disclosure contemplates any suitable arrangement of the client system 606, the server 602, and the network 604. As an example and not by way of limitation, two or more of the client system 606, and the server 602 may be connected to each other directly, bypassing network 604. As another example, two or more of the client system 606, and server 602 may be physically or logically co-located with each other in whole or in part. Moreover, although FIG. 6 illustrates a particular number of client systems 606, servers 602, and networks 604, this disclosure contemplates any suitable number of client systems 606, servers 602, and networks 604. As an example and not by way of limitation, network environment 600 may include multiple client system 606, servers 602, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client system 606 and the server 602 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client system 606 may be an electronic device including hardware, software, or embedded logic components or a combination of two or more such components and capable of carrying out the appropriate functionalities implemented or supported by client system 606. As an example and not by way of limitation, a client system 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 606. A client system 606 may enable a network user at client system 606 to access network 604. A client system 606 may enable its user to communicate with other users at other client systems 606.

In particular embodiments, client system 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 606 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 606 one or more Hyper Text Markup Language (HTML) files responsive to the HTTP request. Client system 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 602 may be capable of linking a variety of entities. As an example and not by way of limitation, server 602 may enable users to interact with each other as well as other entities, or to allow users to interact with these entities through an application programming interfaces (API) or other communication channels.

In particular embodiments, server 602 may include a variety of servers, sub-systems, programs, modules, logs, and data stores. In particular embodiments, server 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 602 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment in which network requests are received at one or more servers, a method for abating padding oracle attacks comprising:
   receiving an electronic message comprising one or more unpadded blocks and at least one padding block that fills the electronic message out to a uniform length;
   generating a digest of the electronic message by processing the one or more unpadded blocks of the electronic message and excluding the at least one padding block of the electronic message;
   determining whether an entry indicative of the digest of the electronic message exists in a database;
   if an entry associated with the digest does not exist in the database, adding an entry associated with the digest to the database that comprises a counter associated with the entry; and
   if an entry associated with the digest exists in the database, incrementing the counter associated with the entry;
   determining, based on the counter associated with the entry, whether the electronic message is part of a padding oracle attack; and
   if, based on the determination, the received electronic message is not part of a padding oracle attack, forwarding the received one or more unpadded blocks and the received at least one padding block of the electronic message to an oracle server device; and
   if, based on the determination, the received electronic message is part of a padding oracle attack, blocking the received one or more unpadded blocks and the received at least one padding block of the electronic message from reaching the oracle server device.

2. The method as recited in claim 1, wherein generating the digest of the electronic message comprises processing the one or more unpadded blocks of the electronic message and excluding the at least one padding block of the electronic message through a one-way hash algorithm that results in a digest of fixed size.

3. The method as recited in claim 2, wherein the one-way hash algorithm comprises one of Secure Hash Algorithm-256 or Secure Hash Algorithm-512.

4. The method as recited in claim 1, wherein determining whether the entry associated with the digest of the electronic message exists in the database comprises performing a database lookup using the digest as a lookup key.

5. The method as recited in claim 1, wherein adding the entry associated with the digest to the database comprises adding an entry comprising the digest, the counter, and a timestamp to the database.

6. The method as recited in claim 5, wherein determining, based on the counter associated with the entry, whether the electronic message is part of a padding oracle attack comprises determining whether the counter associated with the entry is above a threshold amount.

7. The method as recited in claim 6, further comprising determining a time since the counter was last incremented.

8. The method as recited in claim 7, wherein determining the time since the counter was last incremented comprises identifying an elapsed time between the timestamp from the entry and a current time.

9. The method as recited in claim 8, wherein determining whether the electronic message is part of a padding oracle attack is further based on whether the time since the counter was last incremented is below a threshold amount of time.

10. The method as recited in claim 9, further comprising deleting an entry in the database associated with a timestamp that is older than a database storage time threshold.

11. The method as recited in claim 1, wherein blocking the received one or more unpadded blocks and the received at least one padding block of the electronic message further comprises:
    identifying a sender of the electronic message; and
    providing a network error to the sender.

12. A non-transitory computer readable storage medium comprising instructions that, when executed by at least one processor, cause a computer system to perform steps comprising:
    intercepting an electronic message intended for an oracle server device, the intercepted electronic message comprising one or more unpadded blocks and at least on padding block that fills the electronic message out to a uniform length;
    generating a digest of the intercepted electronic message by processing the one or more unpadded blocks of the intercepted electronic message and excluding the at least one padding block of the intercepted electronic message;
    determining whether an entry associated with the digest of the intercepted electronic message exists in a database;
    if an entry associated with the digest does not exist in the database, adding an entry associated with the digest to the database that comprises a counter associated with the entry; and
    if an entry associated with the digest exists in the database, incrementing the counter associated with the entry;
    determining, based on the counter associated with the entry, whether the intercepted electronic message is part of a padding oracle attack; and
    if the intercepted electronic message is not part of a padding oracle attack, forwarding the intercepted one or more unpadded blocks and the intercepted at least one padding block of the electronic message to the oracle server device; and if the intercepted electronic message is part of a padding oracle attack, blocking the intercepted one or more unpadded blocks and the intercepted at least one padding block of the electronic message from reaching the oracle server device.

13. The non-transitory computer readable storage medium as recited in claim 12, wherein generating the digest of the intercepted electronic message comprises processing the one or more unpadded blocks of the electronic message and excluding the at least one padding block of the intercepted electronic message through a one-way hash algorithm that results in a digest of fixed size.

14. The non-transitory computer readable storage medium as recited in claim 13, wherein determining whether the entry associated with the digest of the intercepted electronic message exists in the database and whether the intercepted electronic message is part of a padding oracle attack comprises:
   identifying the entry associated with the intercepted electronic message in the database using the digest as a lookup key;
   identifying the counter associated with the entry; and
   determining whether the counter is above a threshold amount.

15. The non-transitory computer readable storage medium as recited in claim 14, wherein determining whether the intercepted electronic message is part of a padding oracle attack further comprises:
   identifying a timestamp associated with the entry in the database; and
   determining whether and elapsed time between the timestamp associated with the entry and a current time is below a threshold amount of time.

16. The non-transitory computer readable storage medium as recited in claim 15, wherein blocking the intercepted one or more unpadded blocks and the intercepted at least one padding block of the electronic message further comprises identifying a sender.

17. The non-transitory computer readable storage medium as recited in claim 16, wherein blocking the intercepted one or more unpadded blocks and the intercepted at least one padding block of the electronic message further comprises providing an HTTP network error to the identified sender of the electronic message to obfuscate whether the electronic message failed decryption by the oracle server device.

18. The non-transitory computer readable storage medium as recited in claim 17, further comprising instructions that, when executed by the least one processor, cause the computer system to delete an entry in the database associated with a timestamp that is older than a database storage time threshold.

19. A system comprising:
   at least one processor; and
   at least one non-transitory computer-readable storage medium storing instructions thereon that, when executed by the at least one processor, cause the system to:
      intercept an electronic message intended for an oracle server device, the intercepted electronic message comprising one or more unpadded blocks and at least one padding block that fills the electronic message out to a uniform length;
      generate a digest of the intercepted electronic message by processing the one or more unpadded blocks of the intercepted electronic message and excluding the at least one padding block of the intercepted electronic message;
      determine whether an entry associated with the digest of the intercepted electronic message exists in a database;
      if an entry associated with the digest does not exist in the database, add an entry associated with the digest to the database that comprises a count associated with the entry; and
      if an entry associated with the digest exists in the database, increment the count associated with the entry;
      determine, based on the count associated with the entry, whether the electronic message is part of a padding oracle attack; and
      if the electronic message is not part of a padding oracle attack, forward the intercepted one or more unpadded blocks and the intercepted at least one padding block of the intercepted electronic message to an oracle server device; and
      if the electronic message is part of a padding oracle attack, abate the padding oracle attack by blocking the intercepted one or more unpadded blocks and the intercepted at least one padding block of the intercepted electronic message.

20. The system as recited in claim 19, further storing instructions thereon that, when executed by the at least one processor, cause the system to generate the digest of the intercepted electronic message by processing the one or more unpadded blocks of the electronic message and excluding the at least one padding block of the electronic message through a one-way hash algorithm that results in a digest of fixed size.

* * * * *